No. 889,489. PATENTED JUNE 2, 1908.
W. E. SNEDIKER.
SHOCK ABSORBER FOR VEHICLE WHEELS.
APPLICATION FILED MAR. 16, 1907.
2 SHEETS—SHEET 1.
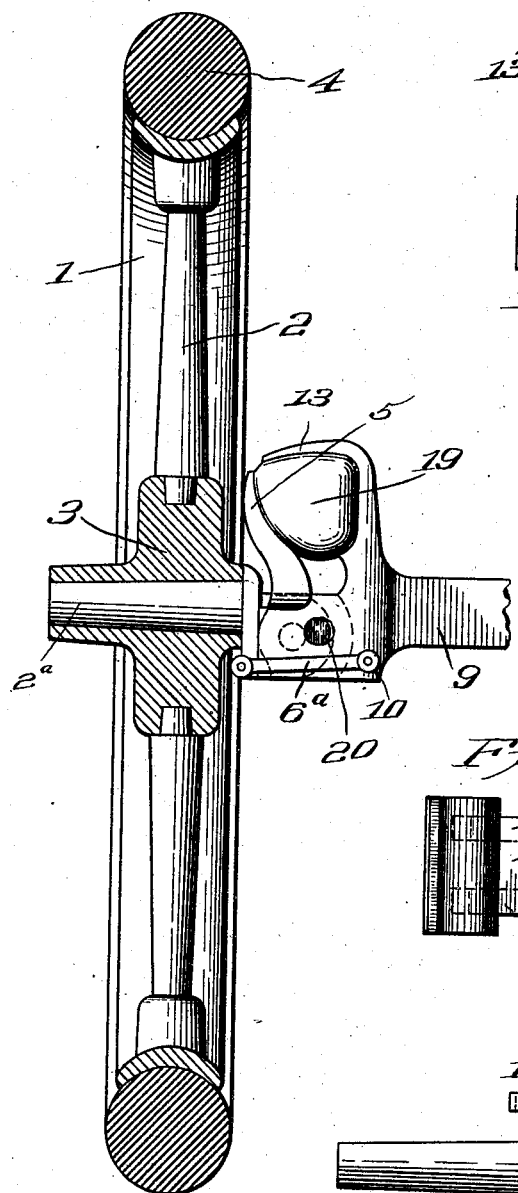
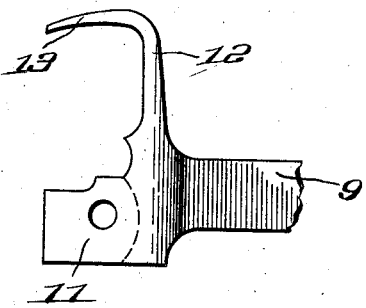
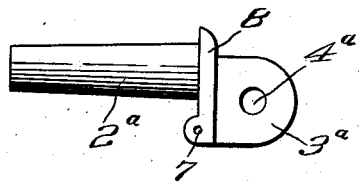
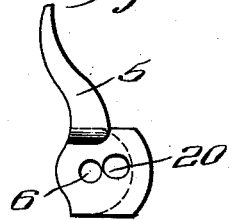
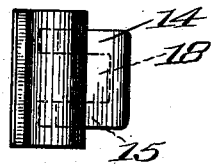
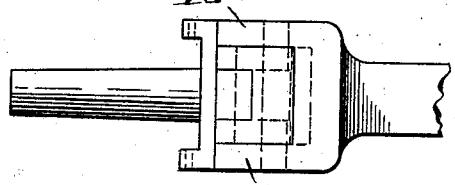
Witnesses
J. W. Millward.
N. L. Beal
Inventor
William E. Snediker,
By his Attorney No. 889,489. PATENTED JUNE 2, 1908.
W. E. SNEDIKER.
SHOCK ABSORBER FOR VEHICLE WHEELS.
APPLICATION FILED MAR. 16, 1907.

2 SHEETS—SHEET 2.

Witnesses
Inventor
William E. Snediker.
By his Attorney

UNITED STATES PATENT OFFICE.

WILLIAM E. SNEDIKER, OF NEW YORK, N. Y.

SHOCK-ABSORBER FOR VEHICLE-WHEELS.

No. 889,489.  Specification of Letters Patent.  Patented June 2, 1908.

Application filed March 16, 1907. Serial No. 362,670.

*To all whom it may concern:*

Be it known that I, WILLIAM E. SNEDIKER, a citizen of the United States, and a resident of New York city, in the county of New York and State of New York, whose post-office address is 540 West One Hundred and Forty-sixth street, New York city, New York, have invented certain new and useful Improvements in Shock-Absorber for Vehicle-Wheels, of which the following is a full, clear, and exact description, whereby any one skilled in the art may make and use the same.

The invention relates to shock absorbing devices, and more particularly to such a device applied intermediate the wheel and the axle which supports it.

The objects of the invention are to provide a resilient cushion intermediate a wheel and its axle, for absorbing shock and jar which might ordinarily be transmitted to the axle and appurtenant parts.

A still further object is to provide an arrangement of lever and cushion device which will give a maximum efficiency for absorbing vibration, with a minimum deflection of the main operative parts.

Figure 7:
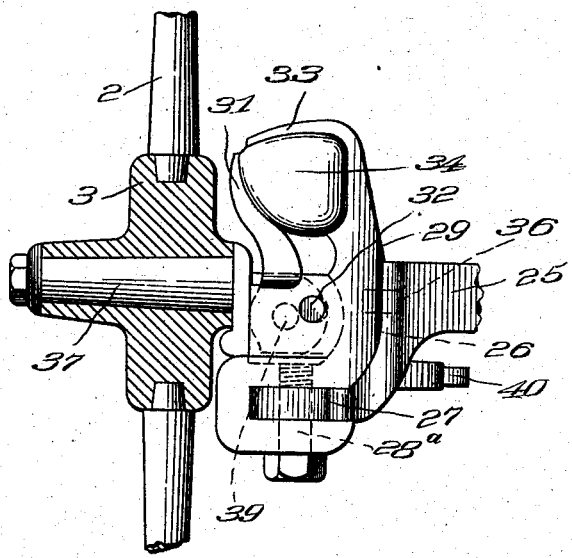
Figure 9:
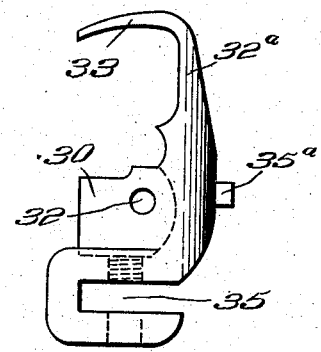
Figure 8:
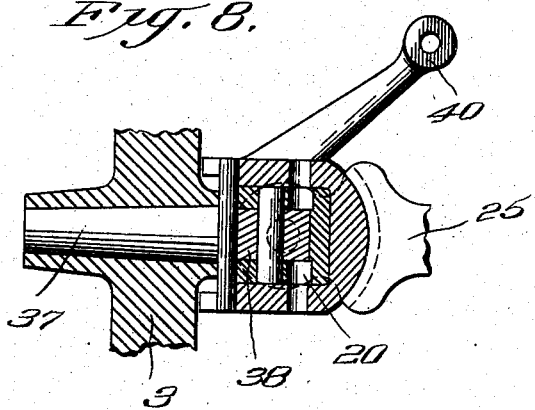
Figure 10:
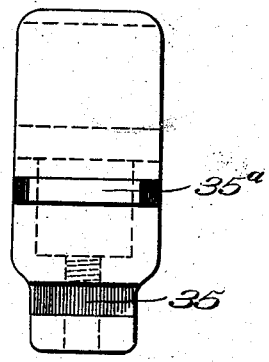

Referring to the drawings:—Figure 1 is a partial sectional view of a wheel embodying the invention. Fig. 2 is a detailed view in elevation, of the end of the axle bar. Fig. 3 is a detailed view in side elevation, of the axle arm or wheel bar. Fig. 4 is a view in elevation of the shock absorbing lever. Fig. 5 is a plan view of the lever shown in Fig. 4. Fig. 6 is a plan view of the end of the axle, axle arm and lever assembled, as illustrated in Fig. 1. Fig. 7 is a view in elevation and partial section showing a steering wheel with the invention complete. Fig. 8 is a horizontal section through the parts shown in Fig. 7. Fig. 9 is a detailed view in side elevation of the steering knuckle. Fig. 10 is a rear elevation of the steering knuckle.

It has been common practice to use cushion tires of various forms, and spring devices, intermediate vehicle wheels and their axles, for absorbing shock and vibration incidental to the running of the vehicle wheel over irregular surfaces.

It is one of the objects of the present invention, to provide a cheap and economical shock absorber intermediate the wheel and its axle without necessitating the use of expensive tires and elaborate spring mechanisms.

A further feature of the invention resides in the renewability of a shock absorbing material which is comparatively small and inexpensive.

In the accompanying drawings, the numeral 1 denotes a vehicle wheel provided with spokes 2, a hub 3 and a tire 4, the latter shown herein as of circular cross section. This wheel 1, is mounted and has a bearing upon a stub axle $2^a$, provided with an extension $3^a$, having a pivoted opening $4^a$ by which it is pivoted to a shock absorbing lever 5, through an opening 6, as clearly shown in Fig. 4 of the drawing. This stub axle has always maintained a substantially horizontal position, through the natural arrangement of the parts. To insure this position, strut bars or space bars $6^a$ are employed, and these are pivoted at one end to bosses 7, upon the flange 8 of the stub axles, and at the opposite end to the main axle bar 9, as at 10. The main axle bar has a bifurcated end 11, overlying it is a web 12 which rises vertically from the axle bar and terminates in the substantially horizontal part 13.

Within the bifurcated end 11 of the main axle bar 9, is pivotally arranged the shock absorbing lever 5. The pivots for this lever extend through the outer side portions 14—15 and through the sides 16—17 of the bifurcated axle end. Between the sides 14—15 is formed an opening 18 within which the end $3^a$ of the stub axle $2^a$ is inserted and pivoted. Between the shock absorbing lever 5 and the web 12—13 is arranged a resilient material 19, which normally is under a fair amount of compression, owing to the weight of the parts carried by the axle of the vehicle.

Attention is called to the arrangement of the pivot of the stub axle with reference to the shock absorbing lever, and the pivots of the shock absorbing lever, with reference to the main axle 9, and their relation to the shock absorbing lever. A downward movement of the axle moves the pivot 20 of the shock absorbing lever downward in a substantially vertical plane. As the wheel rests upon a fixed surface, the shock absorbing lever 5 is naturally turned upon this pivot against the shock absorbing material 19. At the same time, the pivot between the stub axle 2ª and the shock absorbing lever, permits a substantially vertical arrangement of the wheel 1.

Thus far the device has been described in connection with a wheel always running substantially at right angles to the axis of the main axle. In the remaining figures of the drawings there is illustrated a wheel of the type commonly known as the "independent steering wheel" type, commonly used on power propelled vehicles. In said form, the main axle 25 has a socket 26, with a projecting portion 27 underlying it, to provide a horizontal bearing through an opening 35 for the shock absorbing parts of the mechanism. Mounted within the socket 26 is a steering knuckle member 29, having a bifurcated end 30, within which is pivoted the shock absorbing lever 31 as at 32. This steering knuckle member, as in the case of the axle end heretofore described, has a vertical web 32ª, with an extension 33 which form a sufficient bearing for the resilient shock absorbing material 34. At its lower end it is recessed at at 35, to overlie and underlie the extension 27 of the main axle, and is pivoted thereto to move in a horizontal plane by the pivot 28ª. On its rear face adjacent to the socket 26, it is provided with a fin or slide 35ª which rests within a slideway 36 of circular form located in the seat 26 formed at the end of the main axle.

It will be seen from the description, that the steering knuckle 29 has ample bearing for horizontal movement through the intermeshing of the parts 35ª—36, the socket 26 and the opening 35 and extension 27. The stub axle 37, with its pivoted extension 38, is arranged within the bifurcated end of the shock absorbing lever 31 and pivoted as at 39. The shock absorbing lever with the stub axle, is in turn, pivoted to the steering knuckle 29 at at 32. This device with the wheel and shock absorbing parts of the mechanism, are self-contained within the steering knuckle 29, which is provided with a steering arm 40, which may be coupled up with any desired arrangement of steering apparatus. It is also apparent that the steering knuckle and parts carried by it, may be readily moved in a horizontal direction and upon the vertical pivot 28ª, without impairing the effective action of the shock absorber.

Obviously various forms of the device might be used, and its details might be materially changed without departing from the intent or scope of the invention which contemplates a shock absorber of efficient leverage for preventing the transmission of shock or jar from the vehicle wheel to the axle and parts carried thereby.

What I claim as my invention and desire to secure by Letters Patent is:

1. A shock absorber for vehicle wheels comprising a resilient cushion interposed between the main axle and its wheel, a stub axle bearing the wheel and a lever movable with reference to the stub axle and main axle and reacting against the resilient cushion.

2. A shock absorber comprising a resilient cushion, an axle, a retainer for the cushion formed upon the axle, a wheel bearing pivotally mounted with respect to the axle, and a lever pivotally arranged with reference to the axle and the wheel bearing and arranged to bear against the resilient cushion.

3. In a device of the class specified, in combination an axle, a wheel bearing pivoted thereto, a lever pivoted to the axle and having a loose connection with the wheel bearing, and a resilient cushion interposed between the lever and the axle.

4. In a device of the class specified, an axle provided with a bifurcated end, a lever pivoted in the opening of said end, an axle bearing pivoted to said lever, and a resilient cushion intermediate the lever and the axle.

5. In a device of the class specified, an axle having a bifurcated end, a lever pivoted therein and provided with a recess, an axle bearing pivoted within said recess, and resilient means for limiting the movement of the lever with reference to the axle.

6. In a device of the class specified, an axle having a bifurcated end, a lever pivoted therein and provided with a recess, an axle bar pivoted within said recess, resilient means for limiting the movement of the lever with reference to the axle, and means for maintaining the axle bar in vertical position irrespective of the movement of the axle.

7. In a device of the class specified, an axle provided with a seat, a steering knuckle arranged within said seat and having a vertical opening, a pivot intermediate the steering knuckle and seat, a lever pivoted to said steering knuckle, an axle bar pivoted with reference to said steering knuckle, and a resilient cushion interposed between the lever and the steering knuckle.

8. A shock absorber for vehicles having a compound lever interposed between the main axle and wheel and comprising a wheel bearing and a lever both loosely mounted with respect to the main axle and to each other, and a resilient material interposed in said leverage system to absorb shocks intermediate the wheel and main axle.

9. In a device of the class specified, in combination with an axle, a wheel bearing connected therewith for horizontal and vertical movements and connections, including a lever and a resilient cushion interposed between the axle and wheel bearing, whereby the movement between said parts is resisted.

10. In a device of the class specified, in combination, an axle, a wheel bearing pivoted thereto for vertical and horizontal oscillations, a shock absorbing lever movable with respect to the main axle and wheel bearing, and a shock absorbing material resisting the movements of said lever.

11. In a shock absorber for vehicles, a main axle, two levers angularly disposed to each other and movable with respect to the main axle, one of said levers forming a wheel bearing, and a resilient material interposed between the other of said levers and the main axle.

WILLIAM E. SNEDIKER.

Witnesses:
WM. H. BARKER,
NETTIE L. BEAL.